United States Patent [19]

Mosbrucker et al.

[11] Patent Number: 4,497,337

[45] Date of Patent: Feb. 5, 1985

[54] FLOOR TRAP PRIMER VALVE

[75] Inventors: Gregory A. Mosbrucker; Dewayne M. Abelein, both of Portland, Oreg.

[73] Assignee: Precision Plumbing Products, Inc., Portland, Oreg.

[21] Appl. No.: 530,903

[22] Filed: Sep. 12, 1983

[51] Int. Cl.³ .............................................. F16L 55/24
[52] U.S. Cl. ................................ 137/247.25; 137/118
[58] Field of Search ............... 137/118, 247.25, 204, 137/102

[56] References Cited

U.S. PATENT DOCUMENTS

| 1,967,644 | 7/1934 | Williams | 137/118 |
| 2,233,818 | 3/1941 | Matter | 137/512.2 |
| 2,496,465 | 2/1950 | Goss | 137/118 |
| 2,938,530 | 5/1960 | Matter | 137/115 |
| 3,333,597 | 8/1967 | Sullivan | 137/102 |
| 3,422,835 | 1/1969 | Watts | 137/115 |
| 3,776,269 | 12/1973 | Watts | 137/118 |
| 4,000,752 | 1/1977 | Miller et al. | 137/118 |
| 4,204,556 | 5/1980 | Sullivan | 137/247.25 |

Primary Examiner—Martin P. Schwadron
Assistant Examiner—James R. Shay
Attorney, Agent, or Firm—Eugene D. Farley

[57] ABSTRACT

A valve for automatically charging water into a sewer line trap from a water line containing water under variable pressure comprises a case having a longitudinal bore and means for connecting the case in series flow in the water line. A hollow shaft is mounted in the case and extends from the downstream portion a predetermined distance toward the upstream portion thereof. A piston slidably mounted on the shaft divides the bore of the case into an air chamber downstream of the piston and a water chamber upstream. A floating seal is mounted within the water chamber upstream of the piston and hollow shaft. The seal is advanced and retracted with fluctuations of water pressure in the water line. In its retracted position it charges the water chamber with water and compresses the air in the air chamber. In its advanced position, it discharges the water content of the water chamber into the trap, thereby maintaining the water level thereof.

4 Claims, 4 Drawing Figures

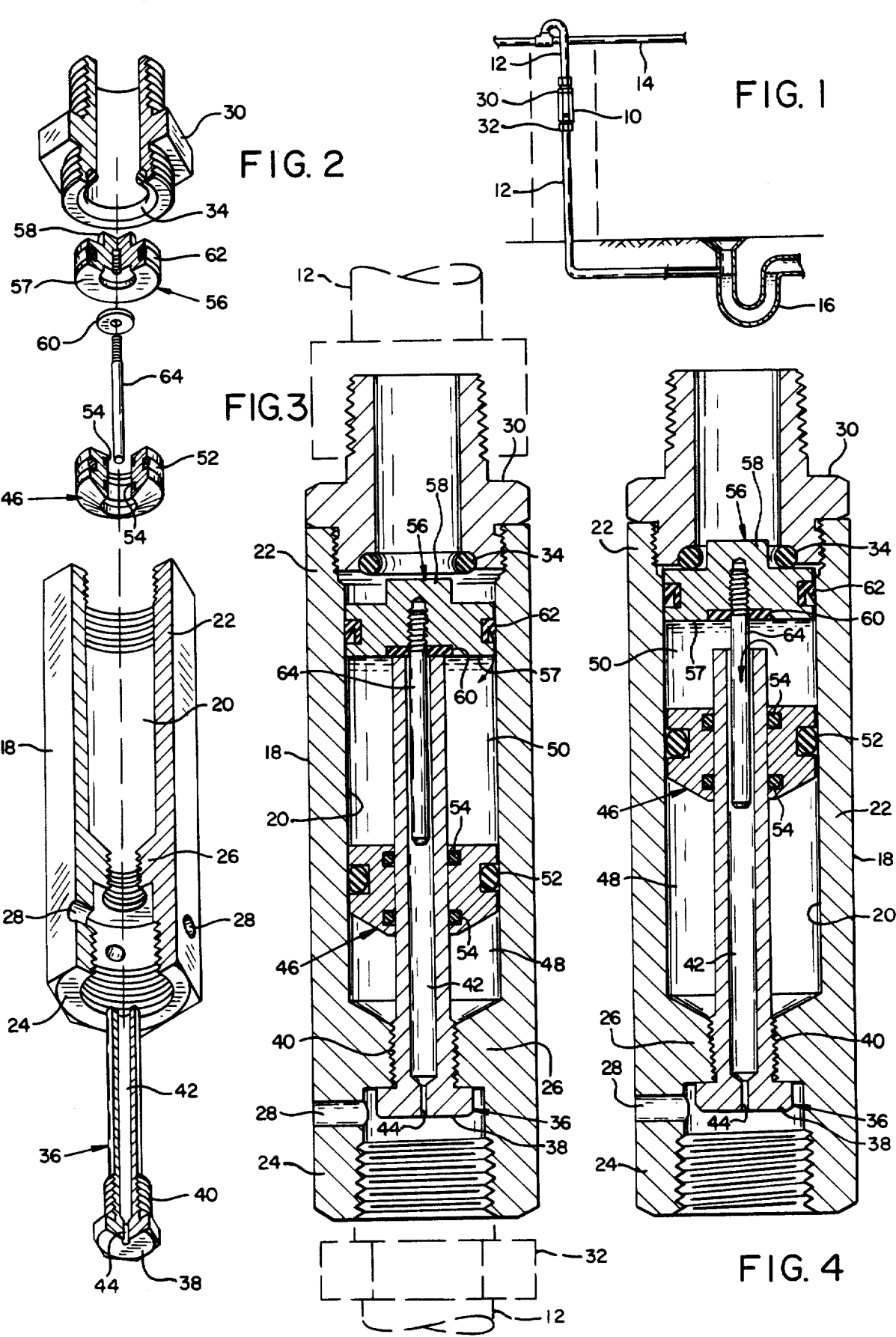

FLOOR TRAP PRIMER VALVE

BACKGROUND AND GENERAL STATEMENT OF THE INVENTION

This invention relates to sewer trap priming valves, i.e. to valves for use in charging water into sewer line water traps to prevent the escape of sewer gas.

Under normal conditions, the level of the water in sewer line traps decreases through evaporation by about one-eighth inch for each twenty-four hours. Accordingly, most municipal plumbing and sanitary codes require that means be provided for supplying water to the traps automatically or periodically to assure that the trap water level will be sufficiently high to render the trap operative and functional at all times.

To meet this requirement, it is usual to connect the trap to the house line through a priming valve which is actuated by variations in pressure in the house line and acts to charge the trap with water upon each fluctuation of pressure in the house line.

Several difficulties attend the use of the conventional sewer trap priming valves.

Most, if not all of them, require adjustment to line pressure in order to function properly. Since the valves are required to operate unattended over a long period of time, their moving parts are subject to corrosion and failure. Many are spring actuated and fail because of spring failure.

It is the general purpose of the present invention to provide a priming valve for sewer line traps which does not require special adjustment for line pressure; which dispenses a uniform amount of water in each of its operations; which maintains a proper level in the sewer line trap at all times; which discharges a metered amount of water with each operation; which will not flow continuously while the line comes back to pressure; which prevents back flow from trap to water line; and which is simple in construction, easily installed in diverse plumbing situations, and economical in operation.

Generally stated, the sewer line trap valve of our invention comprises a case having a bore longitudinally therethrough and means for connecting the case in series flow in a pressurized water line containing water under variable pressure.

A hollow shaft is mounted in the case and extends from the downstream portion toward the upstream portion thereof. A piston is slidably mounted on the shaft and divides the bore of the case into a downstream air chamber and an upstream water chamber.

Floating seal means is mounted within the water chamber upstream of the piston and hollow shaft. Both floating seal means and piston are retracted by water pressure from the water line when a condition of high pressure prevails therein, thereby compressing the air in the air chamber, and advanced by air pressure from the air chamber when a condition of low pressure prevails in the water line. In its retracted position the seal means connects the water line to the water chamber while sealing off the hollow shaft. This charges the water chamber with water and compresses the air in the air chamber.

In its advanced position, the floating seal seals off the water line from the water chamber and connects the water chamber with the hollow shaft. Upon concurrent advancement of the piston, the water content of the water chamber is discharged into the trap. Upon increase of the water pressure in the water line to its normal value, the seal is shifted to its advanced position, charging the valve with water and compressing the air in the air chamber, ready for another cycle of operation.

DESCRIPTION OF A SPECIFIC EMBODIMENT OF THE INVENTION

In the drawings:

FIG. 1 is a schematic diagram illustrating the manner of installation of the presently described sewer line water trap priming valve.

FIG. 2 is an exploded view of the valve.

FIG. 3 is a longitudinal section of the valve in its charged position, and

FIG. 4 is a longitudinal section of the valve in its discharged condition.

As shown in FIG. 1, the water trap priming valve 10 of my invention is adapted for insertion in a pressurized water line 12 which interconnects the house water line 14 and the sewer trap 16. Its function is to keep the trap charged with water so that there is no possibility of the escape of sewer gas.

The valve comprises a case 18 having therethrough a bore 20.

The case is formed with an internally threaded upstream end 22, an internally threaded downstream end 24 and a thickened, internally threaded central segment 26.

Ports 28 are formed in the downstream portion of the case. These serve to prevent the disturbance of the level of water in trap 16 by the development of a vacuum in the line downstream of the primer valve.

Connecting means are provided for connecting the case in series flow in water line 12. To this end there is provided the coupler 30 which connects the upper threaded portion 22 of the case into water line 12, and the coupler 32 which connects the lower threaded portion 24 of the valve case into the water line. The inner end of coupler 30 is recessed and fitted with an O-ring seal 34, the purpose of which will appear hereinafter.

A hollow shaft indicated generally at 36 is mounted within the case and extends from the downstream portion thereof a predetermined distance toward the upstream portion thereof.

Shaft 36 has a bolt head 38, an adjacent threaded neck 40 and an inner bore 42 which merges with a bore of restricted cross section 44 and provides a passageway completely through the shaft.

The shaft is threaded into thickened central section 26 of the case, which accordingly serves as a base, supporting the shaft longitudinally and coaxially of the case in a freely extending manner.

A piston indicated generally at 46 is slidably mounted on shaft 36.

Piston 46 is mounted in sealed relation to the shaft and to the case. It divides the bore of the case into an air chamber 48 downstream of the piston and a water chamber 50 upstream of the piston.

To this end, the piston is provided with a peripheral recess mounting an O-ring 52, and with a pair of internal O-rings 54. The former seals the piston with respect to case 18; the latter, with respect to shaft 36.

Floating seal means indicated generally at 56 are provided upstream of shaft 36 and piston 46 for the purpose of directing a charge of priming water to trap 16 with each fluctuation of water pressure in water line 12.

The floating seal means comprises a body 57 of slightly reduced diameter with respect to the diameter of bore 50 of the case. This provides a marginal passageway through which water can flow around the seal. The valve body has an upstream neck dimensioned for insertion into coupling 30 and providing a shoulder on the valve body which seals against O-ring 34 mounted in coupling 30.

A washer 60 is mounted in a corresponding recess in the downstream face of seal body 56. It serves the purpose of sealing off the passageway provided by hollow shaft 36.

A peripheral annular seal 62 which, in the illustrated form of the invention is a conventional U-cup seal 62, also is mounted on the floating seal body. It seals the seal body from the inner bore of case 18, permitting the flow of water in the downstream direction only.

Mounting means are provided for mounting the floating seal thus provided for free floating longitudinal movement within the case.

For this purpose a threaded end of a guide pin 64 is threaded into the downstream central face of floating valve body 56, penetrating seal washer 60. The free end of pin 64 extends into the enlarged portion 42 of the inner bore of shaft 36, which accordingly serves as a positioning means and guide for the pin.

OPERATION

In operation, the hereindescribed sewer trap primer valve 10 is inserted as shown in FIG. 1 in pressured water line 12 interconnecting house line 14 and trap 16. Since the valve is operative in all pressures of the water line, no adjustment is required.

When the water line pressure reaches full pressure, water entering the valve shifts floating valve 56 to its FIG. 3 position wherein water 60 seals off the passageway through shaft 36. Also, water continues to flow around the edges of the floating valve body, past U-cup seal 62, and into water chamber 50. In so doing it shifts piston 46 in a downstream direction to its FIG. 3 position. This compresses the air in chamber 48.

When the pressure in the water line is reduced for any reason, as by opening a faucet, piston 46 moves in the upstream direction to its FIG. 4 position. As it moves, it also shifts the floating valve to its FIG. 4 position. In this position the valve seals off water line 12 and opens the passageway through the bore of hollow shaft 36. During this movement of the piston, a charge of water is forced from water chamber 50 through hollow shaft 36 and into the water line below the primer valve, whence it flows into trap 16.

As this process is repeated from time to time, the trap is maintained at its proper working level. At no time is water backing up from the trap through some inadvertence able to reach line water 14 since the passage through the valve is closed in both of its operating positions.

Having thus described my invention in preferred embodiments, I claim:

1. A valve for charging water into a sewer line trap from a water line containing water under variable pressure, the valve comprising:
    (a) a case having a bore longitudinally therethrough,
    (b) connecting means for connecting the case in series flow in the water line,
    (c) a hollow shaft mounted in the case and extending from the downstream portion of the case a predetermined distance toward the upstream portion thereof,
    (d) a piston slidably mounted on the shaft in sealed relation thereto and to the case and dividing the bore of the case into an air chamber downstream of the piston and a water chamber upstream thereof,
    (e) floating seal means and
    (f) mounting means mounting the floating seal means within the water chamber upstream of the piston and hollow shaft,
    (g) the floating seal means and piston being retracted by water pressure from the water line when a condition of high pressure prevails therein, thereby compressing the air in the air chamber, and advanced by air pressure from the air chamber when a condition of low pressure prevails in the water line,
    (h) the floating seal means in its retracted position connecting the water line and the water chamber while sealing off the hollow shaft, thereby charging the water chamber with water and compressing the air in the air chamber
    (i) the floating seal means in its advanced position, sealing off the water line from the water chamber and connecting the water chamber with the hollow shaft, thereby upon concurrent advancement of the piston discharging the water content of the water chamber into the trap.

2. The valve of claim 1 wherein the mounting means for mounting the floating seal means comprises a post attached by one of its ends centrally to the floating seal means, with its free end extending for free sliding movement within the bore of the shaft, the diameter of the post being less than the diameter of the opening through the hollow shaft by an amount sufficient to provide passage for a flow of water.

3. The valve of claim 1 wherein the floating seal means includes a peripherally mounted U-cup seal permitting uni-directional flow of water from the water line into the water chamber in the retracted position of the floating seal means.

4. The valve of claim 1 wherein the floating seal means includes on one surface a seal for closing off the water line in the advanced position of the floating seal means, on the opposite surface a seal washer for sealing off the end of the hollow shaft in the retracted position of the floating seal means, and a peripherally mounted annular U-cup seal sealing off the floating seal means from the inner walls of the case while permitting uni-directional flow only of water from the water line into the water chamber in the retracted position of the floating seal means.

* * * * *